(12) United States Patent
Varshney et al.

(10) Patent No.: US 7,286,603 B2
(45) Date of Patent: Oct. 23, 2007

(54) METHOD AND APPARATUS FOR INCREASING DATA RATES IN A WIDEBAND MC-CDMA TELECOMMUNICATION SYSTEM

(75) Inventors: Prabodh Varshney, Coppell, TX (US); Hannu Vilpponen, Irving, TX (US); Mohammad J. Borran, Houston, TX (US)

(73) Assignee: Nokia Corporation, Espoo (FI)

( * ) Notice: Subject to any disclaimer, the term of this patent is extended or adjusted under 35 U.S.C. 154(b) by 229 days.

(21) Appl. No.: 10/427,694

(22) Filed: May 1, 2003

(65) Prior Publication Data
US 2004/0218523 A1    Nov. 4, 2004

(51) Int. Cl.
*H04L 27/28* (2006.01)
(52) U.S. Cl. ........................ 375/260; 370/464
(58) Field of Classification Search ................ 375/140, 375/141, 143, 260; 370/320, 335, 342, 464
See application file for complete search history.

(56) References Cited

U.S. PATENT DOCUMENTS

| | | | |
|---|---|---|---|
| 2003/0072331 A1* | 4/2003 | Jou | 370/503 |
| 2004/0008617 A1* | 1/2004 | Dabak et al. | 370/208 |
| 2004/0071118 A1* | 4/2004 | Dabak et al. | 370/335 |
| 2004/0085919 A1* | 5/2004 | Song et al. | 370/320 |

FOREIGN PATENT DOCUMENTS

| | | |
|---|---|---|
| EP | 1 094 677 A1 | 4/2001 |
| EP | 1 300 977 A1 | 4/2003 |
| WO | WO 01/48970 A1 | 7/2001 |
| WO | WO 02/49305 A2 | 6/2002 |

OTHER PUBLICATIONS

Zhou et al., Finite-Alphabet Based Channel Estimation for OFDM and Related Multicarrier Systems, ☐☐Aug. 2001, IEEE Transactions on Communications, vol. 49, Issue 8, pp. 1402-1414.☐☐*
Muquet et al., Cyclic Prefixing or Zero Padding for Wireless Multicarrier Transmissions?, Dec. 2002, IEEE Transactions on Communications, vol. 50, Issue 12, pp. 2136-2148.*
OFDM or Single-Carrier Block Transmissions?, Z. Wang et al., IEEE Transactions on Communications, pp. 1-15.
Part I: Fourier Transforms and Sampling, http://www.silcom.com/~ aludwig/Signal_processing/Signal_processing.htm ; available Oct. 17, 2005, 11 pages.

* cited by examiner

Primary Examiner—David B. Lugo
(74) Attorney, Agent, or Firm—Alston & Bird LLP

(57) ABSTRACT

A system and method for the efficient transmission of information in a code division multiple access (CDMA) wireless telecommunication system. To increase the rate of reliable transmission, an orthogonal frequency-division multiplexing (OFDM) scheme is implemented in a direct-spread CDMA network, this combination sometimes being referred to as multi-carrier CDMA (MC-CDMA). Information (such as voice and data), interspersed with a known pilot signal, is encoded and spread across the frequency domain, rather than the time domain as in traditional CDMA; the allowable transmission bandwidth is divided into a number of carriers. To achieve even larger transmission rates, the guardband between carriers is eliminated. To prevent interference, the number of pilot transmissions is reduced and a corresponding number of frequency bins at the border of an OFDM block are loaded with zeros. The receiver simply ignores these subcarriers when reconstructing the transmitted signal.

11 Claims, 6 Drawing Sheets

Overlapping OFDM bins

FIG. 1

PRIOR ART

METHOD AND APPARATUS FOR INCREASING DATA RATES IN A WIDEBAND MC-CDMA TELECOMMUNICATION SYSTEM

The present invention relates generally to radio telephony, and more specifically to a method and apparatus for increasing transmission capacity in a wideband MC-CDMA telecommunication system by implementing guardband elimination techniques.

BACKGROUND OF THE INVENTION

The now ubiquitous telecommunication instruments commonly called cellular telephones (or simply "cell phones") are actually mobile radios having a transmitter and a receiver, a power source, and some sort of user interface. They are referred to as cell phones because they are designed to operate within a cellular network. Despite being radios, they typically do not communicate directly with each other. Instead, these mobile telephones communicated over an air interface (radio link) with numerous base stations located throughout the network's coverage area. The network base stations are interconnected in order to route the calls to and from telephones operating within the network coverage area.

Figure 1:
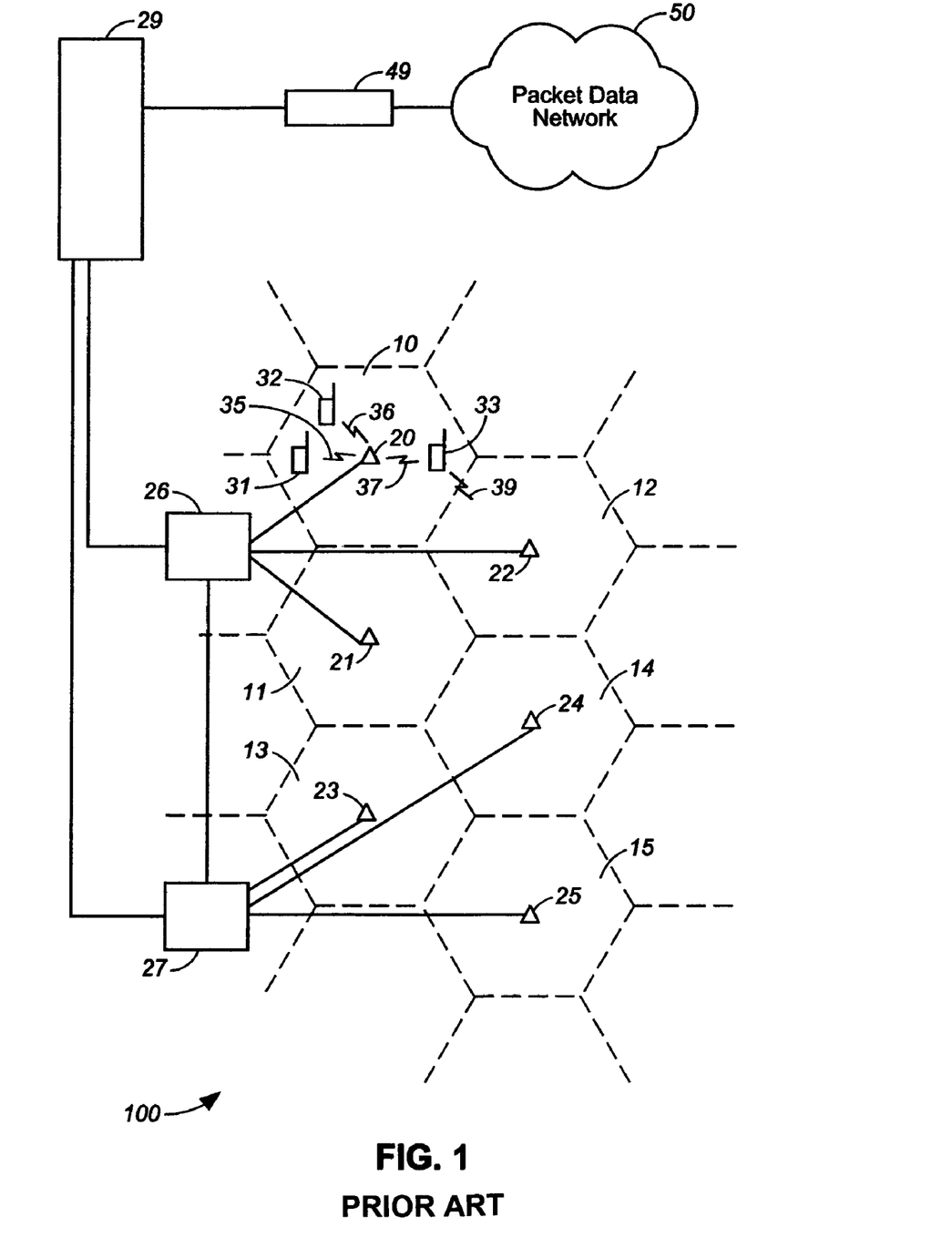
FIG. 1 is functional block diagram illustrating the relationship of selected components of a typical CDMA telecommunication network, such as one that might advantageously employ the apparatus and method of the present invention.

FIG. 1 is a simplified block diagram illustrating the configuration of a typical cellular network 100. As may be apparent from its name, the network coverage area (only a portion of which is shown in FIG. 1) is divided into a number of cells, such as cells 10 through 15 delineated by broken lines in FIG. 1. Although only six cells are shown, there are typically a great many. In the illustrated network, each cell has associated with it a base transceiver station (BTS). Generally speaking, BTS 20 is for transmitting and receiving messages to and from any mobile stations (MSs) in cell 10; illustrated here as MS 31, MS 32, and MS 33, via radio frequency (RF) links 35, 36, and 37, respectively. Mobile stations MS 31 through MS 33 are usually (though not necessarily) mobile, and free to move in and out of cell 10. Radio links 35-37 are therefore established only where necessary for communication. When the need for a particular radio link no longer exists, the associated radio channels are freed for use in other communications. (Certain channels, however, are dedicated for beacon transmissions and are therefore in continuous use.) BTS 21 through BTS 25, located in cell 11 through cell 15, respectively, are similarly equipped to establish radio contact with mobile stations in the cells they cover.

BTS 20, BTS 21, and BTS 22 operate under the direction of a base station controller (BSC) 26, which also manages communication with the remainder of network 100. Similarly, BTS 23, BTS 24, and BTS 25 are controlled by BSC 27. In the network 100 of FIG. 1, BSC 26 and 27 are directly connected and may therefore route calls directly to each other. Not all BSCs in network 100 are so connected, however, and must therefore communicate through a central switch. To this end, BSC 20 is in communication with mobile switching center MSC 29. MSC 29 is operable to route communication traffic throughout network 100 by sending it to other BSCs with which it is in communication, or to another MSC (not shown) of network 100. Where appropriate, MSC 29 may also have the capability to route traffic to other networks, such as a packet data network 50. Packet data network 50 may be the Internet, an intranet, a local area network (LAN), or any of numerous other communication networks that transfer data via a packet-switching protocol. Data passing from one network to another will typically though not necessarily pass through some type of gateway 49, which not only provides a connection, but converts the data from one format to another, as appropriate.

Note that packet data network 50 is typically connected to the MSC 29, as shown here, for low data rate applications. Where higher data rates are needed, such as in 1xEV-DO or 1 xEV-DV networks, the packet data network 50 is connected directly to the BSCs (26, 27), which in such networks are capable of processing the packet data.

The cellular network 100 of FIG. 1 has several advantages. As the cells are relatively small, the telephone transmitters do not need a great deal of power. This is particularly important where the power source, usually a battery, is housed and carried in the cell phone itself. In addition, the use of low-power transmitters means that the mobile stations are less apt to interfere with others operating nearby. In some networks, this even enables frequency reuse, that is, the same communication frequencies can be used in non-adjacent cells at the same time without interference. This permits the addition of a larger number of network subscribers. In other systems, codes used for privacy or signal processing may be reused in a similar manner.

At this point, it should also be noted that as the terms for radio telephones, such as "cellular (or cell) phone" and "mobile phone" are often used interchangeably, they will be treated as equivalent herein. Both, however, are a sub-group of a larger family of devices that also includes, for example, certain computers and personal digital assistants (PDAs) that are also capable of wireless radio communication in a radio network. This family of devices will for convenience be referred to as "mobile stations" (regardless of whether a particular device is actually moved about in normal operation).

In addition to the cellular architecture itself, certain multiple access schemes may also be employed to increase the number of mobile stations that may operate at the same time in a given area. In frequency-division multiple access (FDMA), the available transmission bandwidth is divided into a number of channels, each for use by a different caller (or for a different non-traffic use). A disadvantage of FDMA, however, is that each frequency channel used for traffic is captured for the duration of each call and cannot be used for others. Time-division multiple access (TDMA) improves upon the FDMA scheme by dividing each frequency channel into time slots. Any given call is assigned one or more of these time slots on which to send information. More than one voice caller may therefore use each frequency channel. Although the channel is not continuously dedicated to them, the resulting discontinuity is usually imperceptible to the user. For data transmissions, of course, the discontinuity is not normally a factor.

Code-division multiple access (CDMA) operates somewhat differently. Rather than divide the available transmission bandwidth into individual channels, individual transmissions are spread over a frequency band and encoded. By encoding each transmission in a different way, each receiver (i.e. mobile station) decodes only information intended for it and ignores other transmissions. The number of mobile stations that can operate in a given area is therefore limited by the number of encoding sequences available, rather than the number of frequency bands. The operation of a CDMA network is normally performed in accordance with a protocol referred to as IS-95 (interim standard-95) or, increasingly, according to its third generation (3G) successors, such as those sometimes referred to as 1xEV-DO and 1xEV-DV, the latter of which provides for the transport of both data and voice information.

Figure 2:
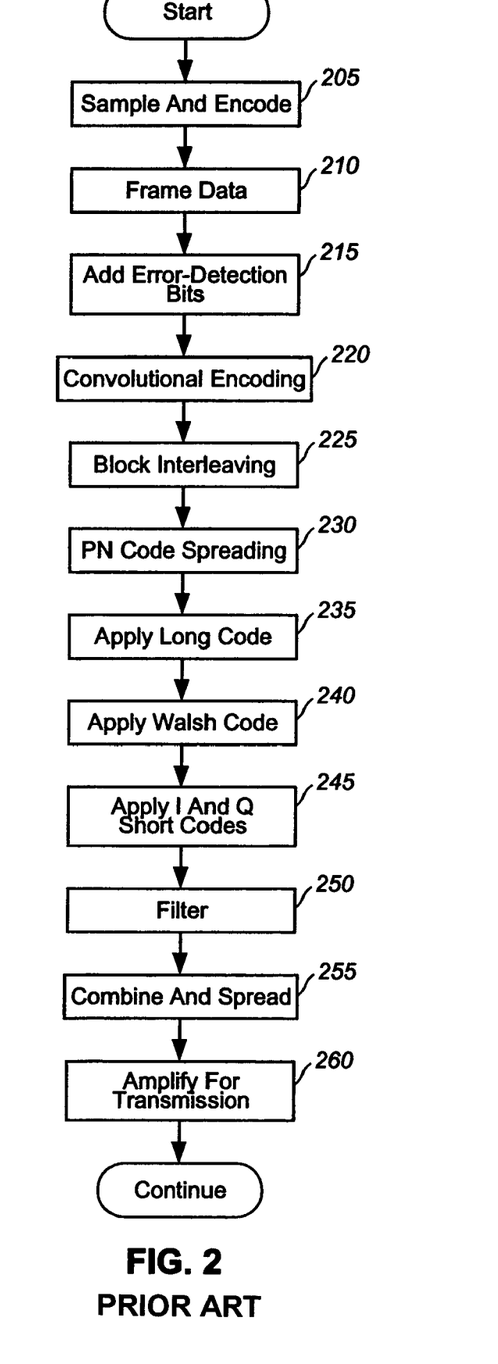
FIG. 2 is a flow diagram illustrating a method of transmitting a CDMA signal according to the prior art.

FIG. 2 is a flow diagram illustrating the basic steps involved in sending a CDMA transmission according to the prior art. At START it is assumed that information from an information source (such as a caller's voice) is available and that a connection has been established with a receiving node. At step 205, the audible voice information is sampled and digitally encoded. The encoded information is then organized into frames (step 210). Error detection bits are then added (step 215) so that the receiver can evaluate the integrity of the received data. The resulting signal is then convolutionally encoded (step 220). Block interleaving is then performed (step 225) on the resulting signal to further enhance the receiver's ability to reconstruct the bit stream with a minimum of error. The interleaved signal is then spread by a pseudonoise (PN) code (step 230), a long code is applied (step 235) and a Walsh code is used to spread the wave form and provide channelization (step 240). I and Q short codes are added (step 245) and the results filtered (step 250) before being combined and spread (step 255), then amplified (step 260) for transmission.

As alluded to above, mobile stations and the network they are a part of are presently being used to carry an increasingly large amount of traffic. Not only is the number of ordinary voice calls increasing, but so is the number of other uses to which mobile stations can be put. Short message service (SMS) messaging and instant messaging are becoming more popular, faxes and emails can be sent through mobile stations, and World Wide Web pages can be downloaded. Portable personal computers can be equipped to send through the network data files such as spreadsheets, word processing documents, and slide presentations. All of this information may enter and leave the network infrastructure through the air interface, meaning that more efficient methods of radio transmission are constantly in demand. The present invention presents a solution that addresses this growing need.

SUMMARY OF THE INVENTION

In one aspect, the present invention is a method of transmitting a radio signal over the air interface in a multi-carrier code division multiple access (MC-CDMA) communication network. The method is intended to make more efficient use of the available spectrum, and includes the steps of encoding and spreading the information stream or streams, then converting the information stream into a plurality of parallel information streams and, after interleaving, mapping the streams into a plurality of subcarriers, the subcarriers in turn forming adjacent carriers of approximately equal size that together span the available bandwidth, wherein at least one and preferably a plurality of subcarriers at each carrier boundary are dummy bins containing no traffic information or pilot signal such that the carriers may be immediately adjacent to each other without experiencing a loss of data due to overlapping subcarriers at their boundary. The method may further include the steps of passing the mapped data through a pulse-shaping filter and amplifying it for transmission.

In another aspect, the present invention is a system radio telecommunication including a orthogonal frequency division modulation (OFDM) modulator for applying an inverse fast Fourier transform to a symbol stream to form a plurality of frequency-block carriers, each carrier divided into a plurality of subcarriers across which the information is spread and interspersed with a plurality of pilot symbols to be used by the receiver for channel estimation, wherein at least one subcarrier at an end of at least one carrier carries only a dummy symbol such that the at least one carrier can be situated in the frequency spectrum adjacent to another of the plurality of carriers without the need for a guardband to separate them. The system may further include a receiver for presenting the received radio signal to an OFDM demodulator for applying a FFT algorithm to create block streams that can be deinterleaved and padded through a detector to reconstruct the transmitted symbol stream.

BRIEF DESCRIPTION OF THE DRAWINGS

For a more complete understanding of the present invention, and the advantages thereof, reference is made to the following drawings in the detailed description below.

DETAILED DESCRIPTION

FIGS. 1 through 7, discussed herein, and the various embodiments used to describe the present invention are by way of illustration only, and should not be construed to limit the scope of the invention. Those skilled in the art will understand the principles of the present invention may be implemented in any similar radio-communication device, in addition to those specifically discussed herein.

The present invention is an improvement on existing CDMA transmission schemes, and has been found to provide higher data rates without sacrificing performance, even when compared to newer CDMA applications such as 1xEV-DV. As mentioned above, code division multiple access (CDMA) is a successful if still imperfect multiple access scheme. In order to address its shortcomings, a number of solutions have been proposed. One solution involves the use together of CDMA techniques and orthogonal frequency division multiplexing (OFDM). OFDM is a modulation method in which multiple user symbols are transmitted in parallel using a large number of different subcarriers. These subcarriers, sometimes called frequency bins, are used to spread transmitted information with respect to frequency rather than time (as with conventional CDMA).

Figure 3:
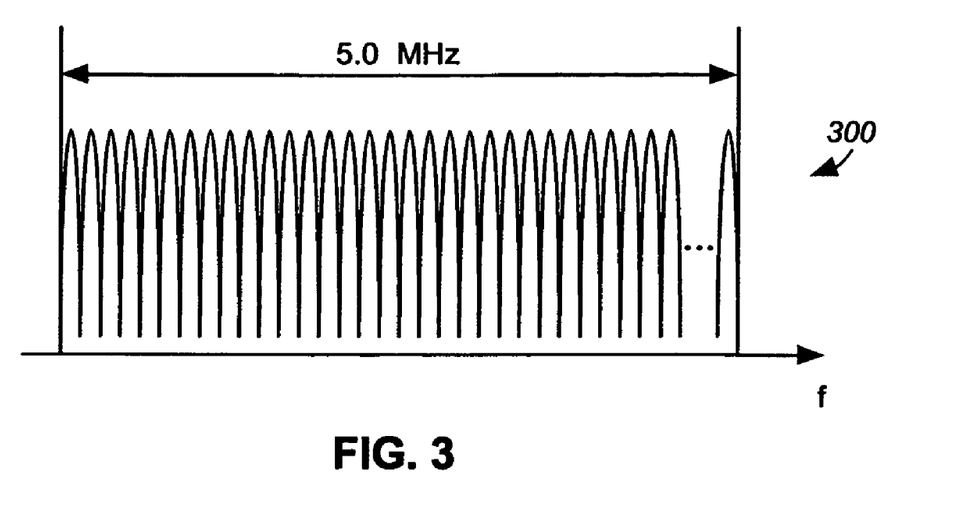
FIG. 3 is a waveform diagram illustrating a waveform distribution of OFDM subcarriers spread in a single block across a 5 MHz frequency band.

FIG. 3 is a waveform diagram illustrating a wavefrom 300 distribution of OFDM subcarriers spread in a single block across a 5 MHz frequency band. (The 5 MHz band is exemplary; others may be suitable as well.) The subcarriers used in OFDM have overlapping spectra, but their signal waveforms are specifically chosen to be orthogonal so as to reduce interference between them. Each of the subcarriers, or 'frequency bins', may carry either information (traffic) or pilot symbols. Note in this context that the terms 'traffic', 'information', and 'data' may sometimes used interchangeably even though a distinction is sometimes made between voice information and data information. Pilot symbols also represent information, but not information that is associated with a user. Rather, they make up a signal known to the receiver that can be used for channel estimation so that the user traffic can be reproduced more faithfully.

Figure 4:
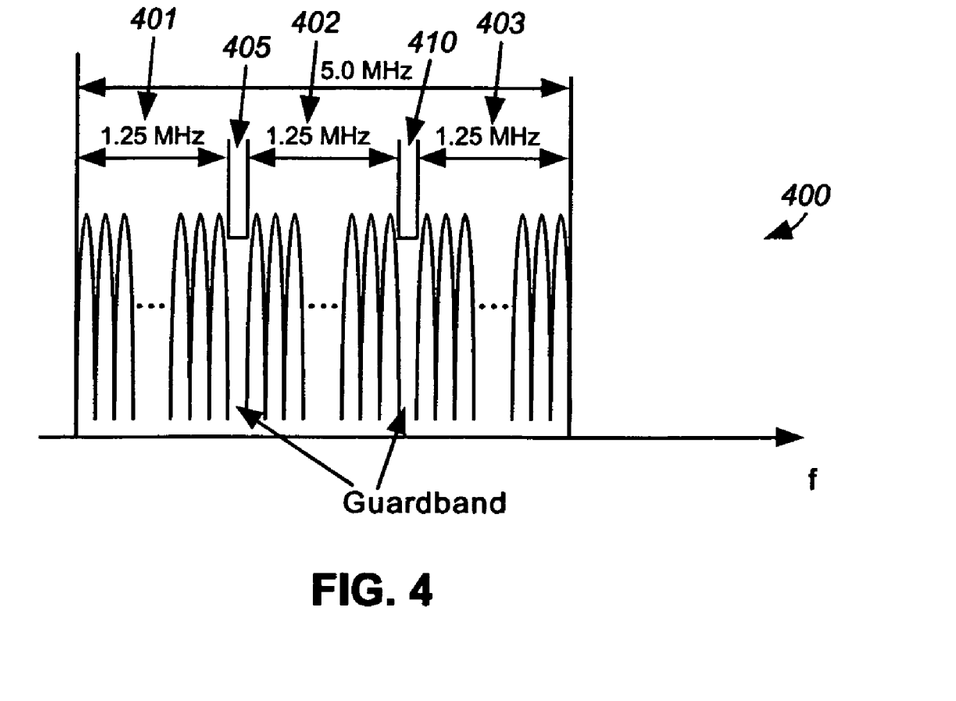
FIG. 4 is a waveform diagram illustrating a waveform occupying the same 5 MHz band as the waveform of FIG. 3, but divided into three OFDM carriers separated by guardbands.

A given information stream need not be spread across the entire available frequency band. FIG. 4 is a waveform diagram illustrating a waveform 400 occupying the same 5 MHz band as the waveform 300 of FIG. 3, but divided into three OFDM carriers (or 'blocks'), enumerated 401, 402, and 403. Each carrier occupies approximately 1.25 MHz of the frequency band. Note that each carrier still includes a relatively large number of subcarriers. As the use of a number of carriers is typical, the combination of OFDM with CDMA is often referred to as a multi-carrier CDMA (MC-CDMA) technology.

The OFDM carriers are separated from each other by a guardband. In FIG. 4, guardband 405 separates carrier 401 and carrier 402, and guardband 410 separates carrier 402 and carrier 403. The purpose of the guardbands is to reduce performance degradation caused by increased bandwidth due to the addition of the cyclic prefix and natural imperfection of the pulse-shaping filters. That is, some interference will occur notwithstanding the fact that the subcarriers are formed of mutually orthogonal waveforms. Nevertheless, the presence of these guardbands, results in an inefficient use of the available bandwidth. To make the MC-CDMA system more efficient, the present invention proposes a technique for eliminating the guardbands while maintaining or even improving performance levels.

Figure 5:
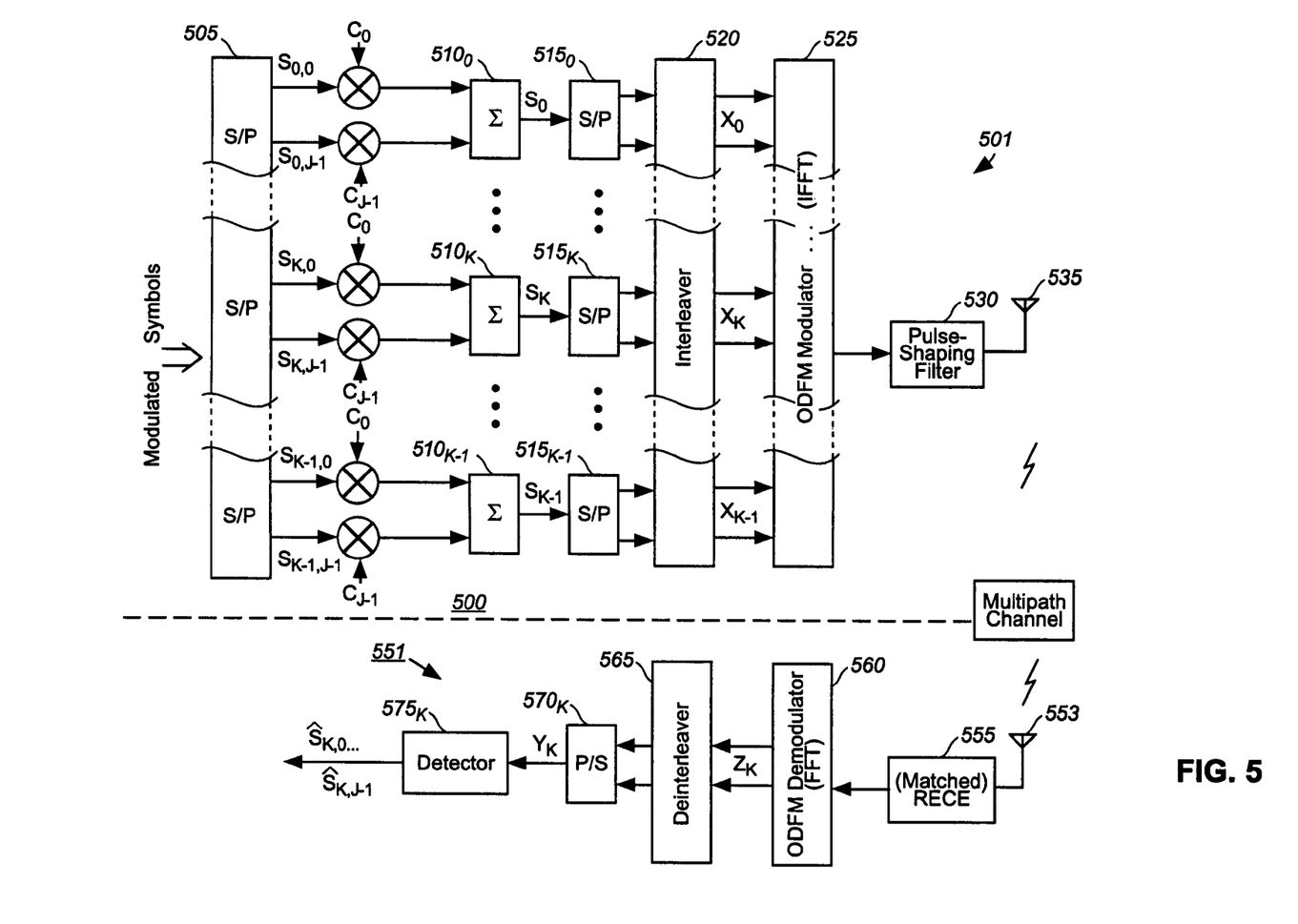
FIG. 5 is a functional block diagram illustrating a system for sending and receiving radio signals in a telecommunication network according to an embodiment of the present invention.

FIG. 5 is a simplified block diagram illustrating an exemplary system 500 for sending information over an air interface using MC-CDMA in accordance with an embodiment of the present invention. The portion of the Figure above the broken line represents a transmitter 501, such as one that might be found in a telecommunication network base station, and below is illustrated a receiver 551 for example one operating in a mobile station. The broken line itself represents a multipath channel over the air interface of the radio telecommunication network.

In transmitter 501, serial-to-parallel (S/P) converter 505 splits the modulated symbol streams (of all K users) into K blocks of J streams ($S_{0,0}$ to $S_{K-1,J-1}$). Each of these streams s is spread by multiplication with a Walsh-Hadamard code ($c_0$ to $c_{J-1}$), and then presented to a summer ($510_0$ ... $510_k$ ... $510_{K-1}$), which sums the streams associated with each block 0 through K-1 into a single spread stream ($S_0$ to $S_{K-1}$). The spread streams $S_k$ are then passed through S/P converters $515_0$ ... $515_k$ ... $515_{K-1}$ before being presented to interleaver 520 for block interleaving. OFDM modulator (IFFT) 525 is coupled to interleaver 520 and maps the interleaved signal into frequency bins (subcarriers) and adds a cyclic prefix.

In accordance with the present invention, the OFDM modulator 525 creates dummy bins of the subcarrier frequency bins at the boundary of each carrier, the dummy bins preferably holding a logical zero that is simply ignored by the receiver. Alternately, the dummy bins can be situated at only one side of the carrier, meaning that the immediately adjacent subcarriers of the adjacent carrier hold information. The dummy bins allow this information to be read notwithstanding the overlap of subcarriers at the carrier boundary. The resulting signal is then passed through a pulse-shaping filter 530 and transmitted over a radio channel using antenna 535.

Receiver 551 includes the antenna 553 for receiving the transmitted radio signal. The received signal is first passed through a matched band-pass receive filter 555 to suppress out-of-band noise and interference. The filtered signal is then passed through an OFDM demodulator (FFT) 560 and demodulated into frequency-domain signal $Z_k$ (signals of other blocks may be present as well, but for simplicity only one is shown). Deinterleaver 565 deinterleaves signal $Z_k$ and is coupled to parallel-to-serial (P/S) converter $570_k$, which creates a bit stream $Y_k$ (again, there may be one associated with each block, even though only one stream is shown in FIG. 5). A detector $575_k$ generates soft or hard decision outputs for each original symbol or bit stream ($\hat{S}_{k,0}$ to $\hat{S}_{K,J-1}$)

Figure 6:
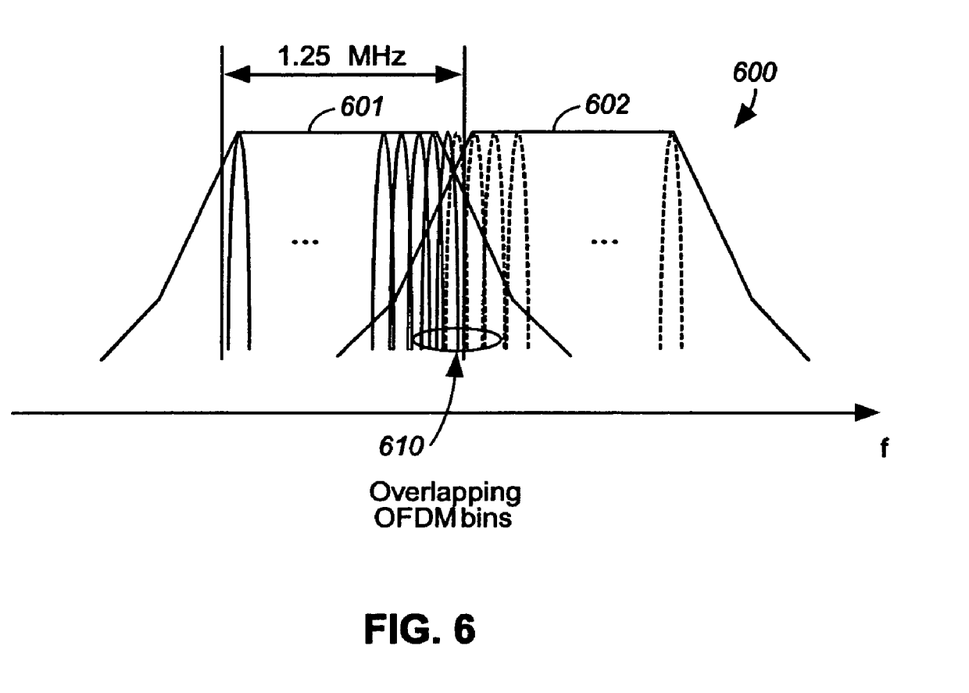
FIG. 6 is a waveform diagram illustrating a waveform formed according to an embodiment of the present invention.

FIG. 6 is a waveform diagram illustrating a waveform 600 formed according to an embodiment of the present invention. Waveform 600, as formed by OFDM modulator 525 (shown in FIG. 5), consists of carrier 601 and carrier 602. Note that in contrast to the waveform 400 of FIG. 4, however, there is no guardband present between the carriers 601 and 602. Instead, overlapping subcarriers 610 occupy the boundary between the adjacent carriers.

Ordinarily, this may render the pilot or traffic bits carried in these subcarriers unusable, and any data lost would have to be recovered by error correction techniques. As mentioned above, however, in accordance with the present invention the overlapping bins 610 are dummy bins, preferably filled only with logical zeros. These dummy bins 610 may include one or more boundary subcarriers from each of the carriers 601 and 602, or may be formed only on one side of the carrier in such a manner that boundary subcarriers of an adjacent carriers my carry usable information.

With respect to FIG. 6, note also that each illustrated carrier 601 and 602 is shown to occupy 1.25 MHz of the frequency spectrum. As compared with an allowable bandwidth of, for example, the waveforms of FIGS. 3 and 4, this would permit the inclusion of four carriers of this dimension, even though only two are shown in FIG. 6. The result is a greater data rate. In this regard, it should be pointed out that the use of four carriers in a 5 MHz band is exemplary only, and that larger or smaller carriers may be used over a larger or smaller allowable bandwidth. The number of carriers may even be adjustable to accommodate, for example, a temporary increase in the amount of traffic.

Figure 7:
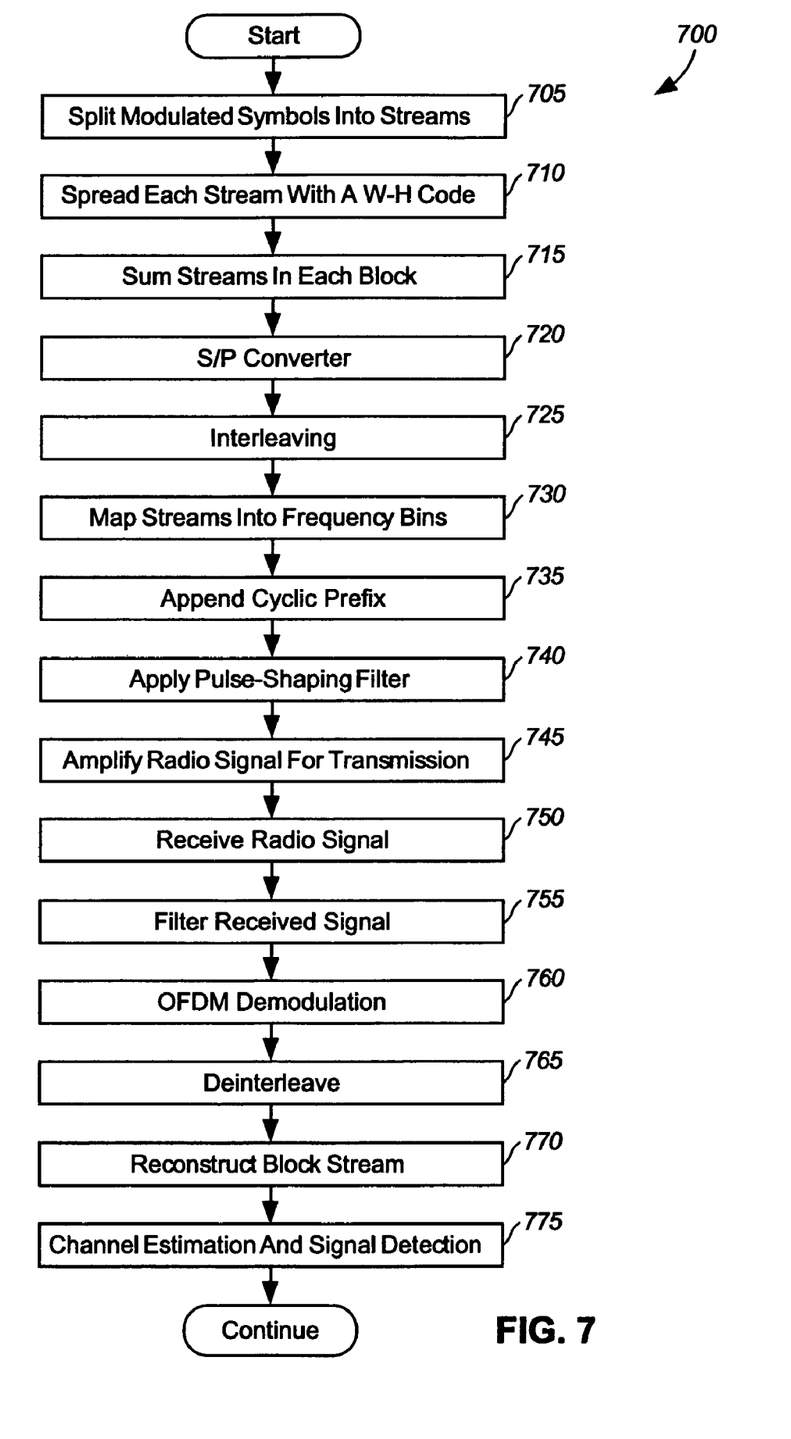
FIG. 7 is a flow chart illustrating a method of processing a radio signal according to an embodiment of the present invention.

FIG. 7 is a flow diagram illustrating a method 700 of receiving a radio signal according to an embodiment of the present invention. Initially, (START), it is presumed that the system of FIG. 5 is being utilized, although the operation of various other embodiments of the present invention should be apparent in light of this disclosure and the accompanying drawings. In addition, it is assumed that the information to be transmitted (including pilot signals) has been encoded and modulated into symbol streams. The process then begins at step 705, where the modulated symbols are divided into K blocks of J streams (step 705). Each of these J streams is then spread with a Walsh-Hadamard code (step 710), then the streams of each block are summed (step 715) to form K streams (for example, $S_0$ to $S_{K-1}$ shown in FIG. 5). Each of the K streams is then separated into streams through S/P converters (step 720) and interleaved (step 725).

The interleaved signals are then mapped into bins (or subcarriers) (step 730) in an OFDM modulator applying an inverse fast Fourier transform (IFFT). As mentioned above, in accordance with the present invention a number of bins at the boundary of each carrier in the multi-carrier signal are left as dummy bins so that no data will be lost due to interference between overlapping subcarriers. The exact number and location of the individual dummy bins may vary according to system design preferences. In some cases dummy bins may overlap with other dummy bins, in others they may overlap with subcarriers holding useable information. In systems where the number of pilot signals interspersed in each carrier is specified by system protocol, the dummy bins may be accommodated by reducing this number, thereby not affecting the actual data capacity of the carrier. The OFDM modulator may also add a cyclic prefix (step 735), and then presents the signal to a pulse-shaping filter (740) before the signal is amplified for transmission (step 745) over a multipath channel.

When an MC-CDMA receiver receives the signal (step 750), it first passes it through a receive filter (step 755), preferably one matched to the pulse-shaping filter of the transmitter. The filtered signal is then presented to an OFDM demodulator and a fast Fourier Transform (FFT) is applied (step 760) to create (for example) signals $Z_0$ to $Z_{K-1}$. The signal for each block is then deinterleaved (step 765) and the block streams $Y_0$ to $Y_{K-1}$ reconstructed using a P/S converter (step 770). Each of the resulting streams are them presented to a detector (step 775) for channel estimation and signal detection.

The preferred descriptions are of preferred examples for implementing the invention, and the scope of the invention should not necessarily be limited by this description. Rather, the scope of the present invention is defined by the following claims.

What is claimed is:

1. In a communication system operable according to a radio communication protocol, a method for transmitting over the air interface information streams in a radio signal that includes pilot symbols, said method comprising: encoding the information stream to be transmitted; spreading the encoded information stream; converting the spread information stream into a plurality of parallel information streams; interleaving the parallel information streams; mapping, using an OFDM modulator, the symbols of the interleaved information streams into a plurality of subcarriers to form the radio signal, wherein the radio signal includes a plurality of carriers, each carrier including a plurality of the subcarriers and being adjacent along the frequency spectrum to at least one other carrier, and wherein at least one subcarrier of each carrier is a dummy bin at the carrier boundary to allow overlapping of subcarriers at the carrier boundary without a loss of information; and transmitting the radio signal.

2. The method of claim 1, further comprising the step of filtering the radio signal through a pulse-shaping filter prior to transmitting it.

3. The method of claim 1, wherein the spreading step is performed using a Walsh-Hadamard code.

4. The method of claim 1, wherein the communication protocol is a code division multiple access (CDMA) protocol.

5. The method of claim 1, wherein the at least one subcarrier at the boundary of each carrier comprises a plurality of subcarriers.

6. The method of claim 5, wherein the communication protocol specifies the number of pilot symbols to be interspersed within the subcarriers of each carrier, and wherein less than the required number of pilot symbols is used in order to accommodate the creation of the dummy bin subcarriers.

7. The method of claim 1, further comprising the step of receiving the transmitted radio signal in a radio receiver.

8. The method of claim 7, further comprising the step of processing the received radio signal using an OFDM demodulator.

9. The method of claim 8, wherein the OFDM demodulator and OFDM modulator apply a fast Fourier transform (FFT) and an inverse fast Fourier transform (IFFT), respectively.

10. The method of claim 7, further comprising the step of filtering the received signal in a matched filter.

11. The method of claim 1, wherein the information streams include information corresponding to a plurality of users.

* * * * *

UNITED STATES PATENT AND TRADEMARK OFFICE
CERTIFICATE OF CORRECTION

| | | |
|---|---|---|
| PATENT NO. | : 7,286,603 B2 | Page 1 of 1 |
| APPLICATION NO. | : 10/427694 | |
| DATED | : October 23, 2007 | |
| INVENTOR(S) | : Varshney et al. | |

It is certified that error appears in the above-identified patent and that said Letters Patent is hereby corrected as shown below:

<u>Column 8,</u>

Line 27, "transmiffed" should read --transmitted--.

Signed and Sealed this

First Day of April, 2008

JON W. DUDAS
*Director of the United States Patent and Trademark Office*